July 30, 1968     G. E. STREETER     3,394,849

LIQUID CONTAINER FOR AUTOMOBILES

Filed Sept. 29, 1966

INVENTOR
Glen E. Streeter

BY
Hovey, Schmidt, Johnson & Hovey
ATTORNEYS.

United States Patent Office 3,394,849
Patented July 30, 1968

3,394,849
LIQUID CONTAINER FOR AUTOMOBILES
Glen E. Streeter, N. Ardinger St., Hamilton, Mo. 64644
Filed Sept. 29, 1966, Ser. No. 582,905
2 Claims. (Cl. 222—185)

ABSTRACT OF THE DISCLOSURE

The vessel was a bottom which is intended to be supported on a substantial cylindrically curved surface. The bottom is similarly curved and has downwardly projecting spaced grippers extending throughout the outer surface thereof. The grippers are of generally inverted conical configuration and terminate in a point. The axes of the various cones are substantially equally spaced, but the length thereof progressively increase from a minimum along an axial medial line of the curved bottom surface to a maximum at the straight edges thereof.

---

This invention relates to a portable beverage container which may be stably supported by the drive shaft hump of a motor vehicle in a conveniently accessible location without interfering with the comfort of the occupants of the vehicle.

Particularly during long road trips, the traveler often desires to carry a thermos jug or other portable beverage container in the passenger compartment of the vehicle to avoid frequent stops for refreshment. This is especially the case during vacation trips in warm weather and at times when children are traveling. Conventional containers, however, are inconvenient to handle and locate within the compartment since, if placed on the floorboard, the container necessarily interferes with the feet of one of the occupants unless the vehicle is not fully loaded. Furthermore, if the container is carried in one of the seats, it is manifest that this also interferes with passenger comfort as well as subjecting the seat to the water or other beverage which may drip or spill as it is drawn from the container.

It is, therefore, the primary object of this invention to provide a beverage container for motor vehicles which may be conveniently located within the passenger compartment without interfering with the comfort of the occupants.

As a corollary to the foregoing object, it is an important aim of the instant invention to provide such a container that may be stably supported by the drive shaft hump of the vehicle so that it will be conveniently accessible and noninterfering as aforesaid and yet supported in a manner to preclude jostling about or tipping as the vehicle traverses rough roads or stops suddenly.

Another important object is to provide such a container having a tap which may be operated to draw liquid therefrom while the container is resting on the drive shaft hump.

Still another important object is to provide a container as aforesaid which positively grips the drive shaft hump and which may be utilized in conjunction with humps of different convexities in order to accommodate vehicles of various makes.

Figure 1:
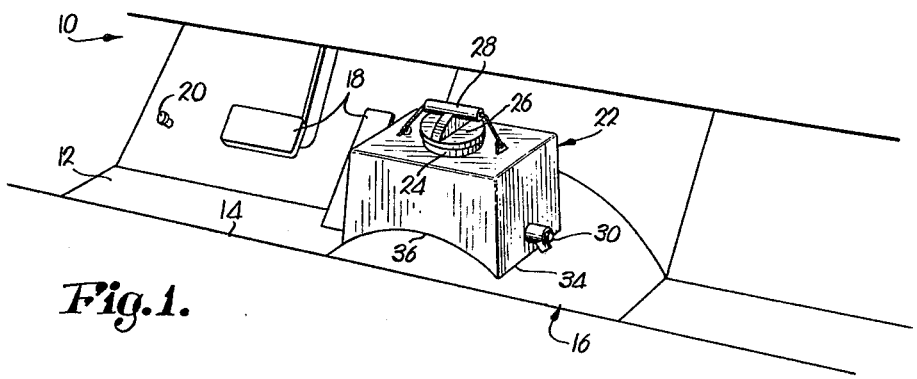
FIGURE 1 is a perspective view of a portion of the passenger compartment of an automobile showing the edge of the front seat, the floorboard, the drive shaft hump, and the container of the instant invention.

Referring to FIG. 1, the numeral 10 designates a portion of the vehicle body including the floorboard 12, the front edge 14 of the front seat, and the drive shaft hump 16 extending centrally longitudinally of body 10. It will be appreciated that hump 16 is transversely convex and provides clearance of the drive shaft (not shown) of the vehicle which forms a driving connection between the transmission of a front engine vehicle and the rear wheels. The accelerator and brake pedals are illustrated at 18 and the dimmer switch at 20.

Referring to the figures in their entireties, a hollow vessel 22 is shown having an inlet 24 in its top closed by a cover or cap 26 which is held in place by a handle 28. A valved outlet in the form of a tap 30 projects from one side of vessel 22 adjacent the bottom 32 thereof. Vessel 22 may be insulated to maintain its contents at a desired temperature.

Vesseel 22 is rectangular in configuration above bottom 32 as viewed in a horizontal plane, and has four vertical sides which cooperate with bottom 32 to define a pair of opposed, straight edges 34 and a pair of opposed curved edges 36 at the boundary of bottom 32. The bottom 32 is concave between edges 34 substantially complementally with hump 16 as is clear in FIG. 2. A plurality of antiskid grippers 38 project downwardly from bottom 32 and penetrate the upper surface of hump 16, illustrated in FIG. 2 as comprising a rug 40 having a backing 42 which overlies a floor plate 44.

Figure 2:
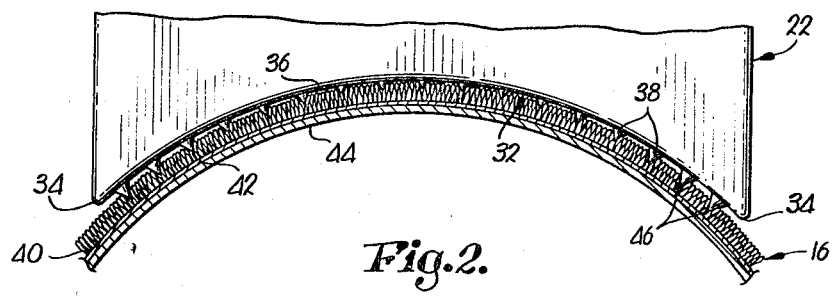
FIG. 2 is a vertical, sectional view taken transversely through the drive shaft hump showing the lower portion of the container in elevation.
Figure 3:
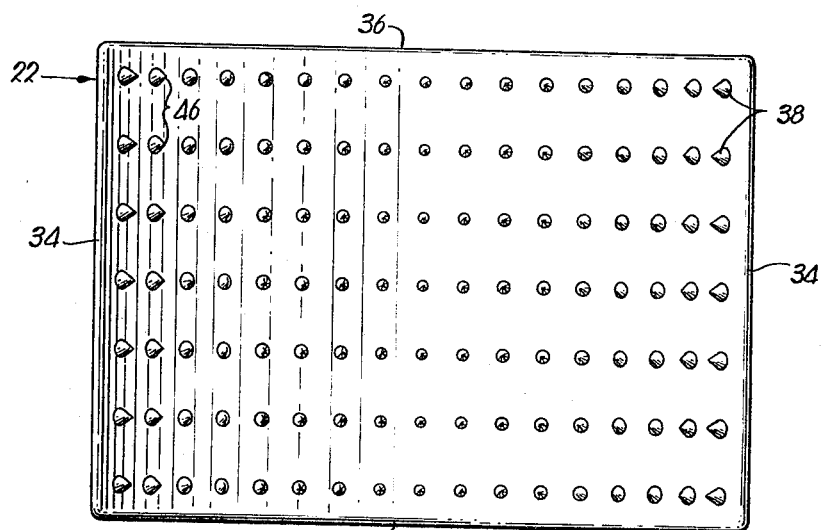
FIG. 3 is a bottom plan view of the container.

A comparison of FIGS. 2 and 3 reveals that grippers 38 are arranged in a regular pattern of 7 rows in one direction and 17 rows in a direction at a right angle to the first direction, thereby forming a rectangular pattern. Grippers 38 may be formed by rigid metallic projections or be composed of a flexible material, and are of a generally inverted, conical configuration. The axes of the various cones are equally spaced for a given row, but the altitudes thereof progressively increase from a minimum at the center of bottom 32 to a maximum as the straight edges 34 are approached.

Being cone-shaped, each gripper 38 terminates in a point 46, the various points 46 defining an imaginary, curved surface which, it will be noted in FIG. 2, has a slightly greater convexity than hump 16, as defined by the outer surface of the nap of rug 40. Thus, the outer grippers 38 penetrate more deeply into rug 40, both by virtue of their increased altitudes and the greater convexity of the aforesaid imaginary surface. In this manner, assuming that hump 16 is the most convex hump upon which vessel 22 would be placed, it will be appreciated that humps of somewhat lesser convexities (such as might be encountered in vehicles of another make) would be accommodated equally well since the outer, straight rows of grippers 38 adjacent edges 34 would always engage and penetrate the outer surface of the hump. Vessel 22 will thus be stably supported even if the more centrally disposed grippers 38 do not engage the hump due to its lesser convexity. Manifestly, although a floor covering in the form of a rug or carpet is illustrated, the grippers of the instant invention serve equally well with other coverings such as rubber mats or the like.

It is also noteworthy that the straight edges 34 lie in a common plane and that all of the points 46 of grippers 38 are disposed above such plane. Therefore, when the container is removed from the vehicle for filling or cleaning purposes, it may be placed on a table or other flat surface without scratching the latter since edges 34 will serve as feet and support vessel 22 with grippers 38 cleaning the underlying surface.

Having thus described the invention, what is claimed as new and desired to be secured by Letters Patent is:

1. For use with a motor vehicle having a drive shaft extending fore and aft therefore and a transversely convex hump overlying the shaft at the floorboard of the body of the vehicle, a liquid container comprising a hollow vessel having four sides and a bottom, the bottom edges of said sides cooperating with said bottom to define a pair of opposed straight edges and a pair of opposed curved edges, said bottom defined by said edges being concavely curved and approximately matching the curvature of said convex hump, said bottom having downwardly projecting spaced grippers extending through the outer surface thereof, said grippers being of generally inverted conical configuration and terminating in a point, the length of said cones progressively increase from a minimum along an axial medial line of the bottom curved surface to a maximum at the straight edges whereby the projections adjacent the straight edges will be first to contact the sides of the convex hump.

2. A container as defined in claim 1 wherein said vessel has a top wall and an inlet therein closed by a cap and a handle holding said cap in place, and one of said side walls having a valved outlet.

References Cited

UNITED STATES PATENTS

| | | | |
|---|---|---|---|
| 2,867,248 | 1/1959 | Forney | 248—149 X |
| 2,899,162 | 8/1959 | Young | 248—154 X |
| 3,022,883 | 2/1962 | Barton et al. | |
| 3,136,461 | 6/1964 | Gregg | 224—42.42 |
| 3,163,287 | 12/1964 | Barnett | 224—42.42 X |

ROBERT B. REEVES, *Primary Examiner.*

N. L. STACK, *Assistant Examiner.*